Nov. 15, 1932.  L. H. BENOIT  1,887,670
WELDING AND CUTTING MACHINE
Filed Nov 16, 1931
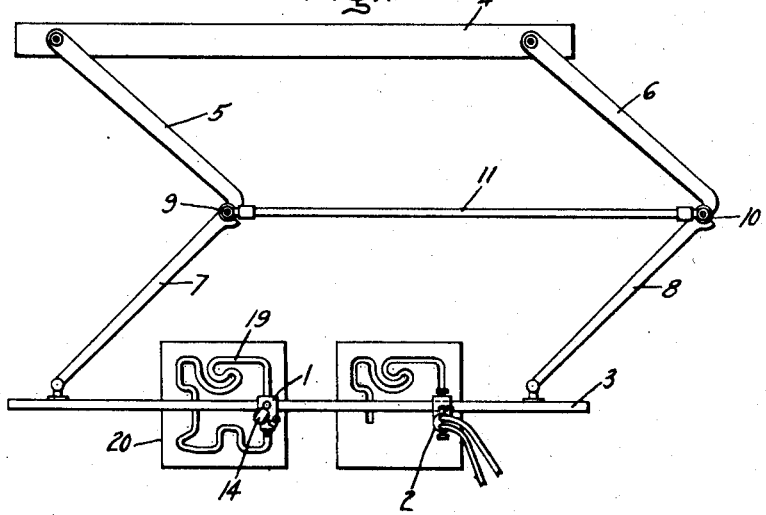
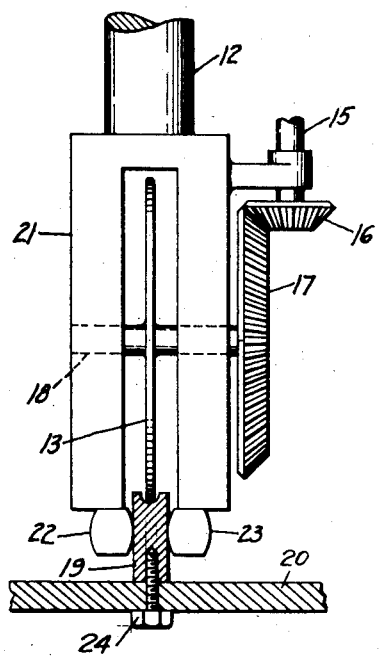
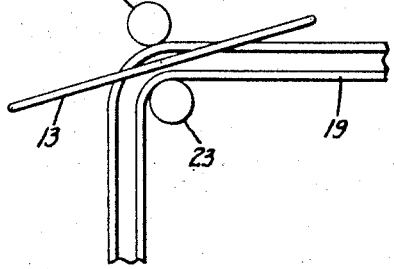
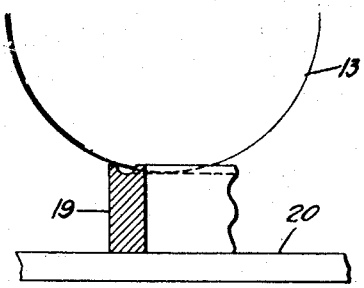
Inventor:
Leo H. Benoit,
by Charles V. Tulla
His Attorney.

Patented Nov. 15, 1932

1,887,670

UNITED STATES PATENT OFFICE

LEO H. BENOIT, OF REVERE, MASSACHUSETTS, ASSIGNOR TO GENERAL ELECTRIC COMPANY, A CORPORATION OF NEW YORK

WELDING AND CUTTING MACHINE

Application filed November 16, 1931. Serial No. 575,496.

My invention relates to welding and cutting machines in which a flame or arc is moved in a predetermined path in accordance with the design of a pattern or templet. Such machines are used for reproducing parts of irregular configuration, and in accordance with one design the movement of the reproducing means is controlled by the movement of a power driven tracer wheel relative to a templet.

It has already been proposed to support the tracer wheel and the reproducing means of such machines on a parallel bar linkage and to provide a track of bendable material for directing the travel of the tracer wheel and the reproducing agency along a path of predetermined configuration. In such arrangements, however, when the track for the tracer wheel had sharp or reentrant curves therein, the tracer wheel would not travel at a uniform rate of speed along the track but would stall or travel at an irregular rate of speed at these points.

According to my invention I eliminate this difficulty by providing the track with a grooved or concaved supporting surface for the tracer wheel, by means of which it is enabled readily to negotiate sharp turns at a uniform rate of speed and guide the reproducing agency over the work at a correspondingly uniform rate of speed. By grooving the surface of the track member, the tracer wheel on approaching a sharp or reentrant curve encounters the bank produced by the groove and automatically twists itself around the curve, thereby securing a continuous motion which is transmitted to the reproducing agency causing it likewise to travel at a constant rate of speed over the work.

My invention will be better understood from the following description taken in connection with the accompanying drawing in which Fig. 1 is a diagrammatic plan view illustrating a reproducing machine employing my invention; Fig. 2 is a detailed view of the tracer wheel and the grooved track for said tracer wheel, and Figs. 3 and 4 are diagrammatic illustrations of the action of the grooved track on the tracer wheel at a curve by means of which it is automatically directed around the curve during its travel along the track.

In Fig. 1 of the drawing, where the invention has been illustrated as applied to a cutting machine, a tracer mechanism 1 and a severing agency 2, which may be an arc or a gas torch, are attached to a bar 3 forming part of a parallel bar linkage. The particular linkage illustrated in the drawing is one of several forms which may be employed and comprises a supporting member 4 to which the bar 3 is attached through pivoted arms 5, 6, 7 and 8 which are connected at joints 9 and 10 by a bar 11. By employing a linkage such as illustrated any predetermined movement imparted to the tracer mechanism 1 is likewise imparted to the severing agency 2.

The tracer mechanism comprises a support 12 for the tracer wheel 13 which is positively rotated by means of a motor 14 connected thereto through a shaft 15, gears 16 and 17, and a shaft 18. The tracer wheel is adapted to rest upon a track member 19 which may be supported on and secured by bolts 24 to a pattern table 20. The track 19 is preferably made of some soft material such as brass which may be readily bent to conform to any predetermined configuration such as illustrated in Fig. 1. The track member 19 has a grooved supporting surface for the tracer wheel 13, and the yoke 21 for the tracer wheel 13 is provided with guide wheels 22 and 23 which engage each side of the track 19 and constitute means for retaining the tracer wheel on the track and positively holding it against lateral movement therefrom.

By grooving the surface of the track 19 according to my invention the tracer wheel 13 is enabled to negotiate sharp turns. The tracer wheel 13 upon encountering the bank produced by the groove at a turn automatically twists itself about the curve and travels along the track at a uniform rate of speed. The action of the grooved track on the tracer wheel at a sharp curve is graphically illustrated in Figs. 3 and 4 of the drawing. If the track is not grooved, the tracer wheel will not go around a sharp turn and the operation of the machine is interrupted at such points. By providing a grooved supporting surface, however, this difficulty is eliminated, and the tracer wheel is caused to traverse the track at a uniform rate of speed and thereby move the severing agency 2 along the work at a correspondingly uniform rate of speed. By employing my improved construction a positive engagement is obtained between the feed roll and the templet without complicating the construction of the track member or the tracer wheel adapted for engagement therewith.

Various parallel bar linkages may be employed in place of the linkage shown in Fig. 1. For example, various pantographic linkages may be used for increasing or decreasing the movement of the fusion agency relative to that of the tracer wheel. The track member may be made of various materials other than brass as above specified, and may be made rigid if so desired. When made rigid, however, the track is adaptable only for the reproduction of a particular design, whereas if made of flexible material its configuration may be changed to produce any desired design. The track member may be secured in any desired manner to its support. The machine illustrated and described may also be used for welding as well as cutting. Combined gas and arc torches such as used in atomic welding may be used. When arc welding or cutting, consuming or non-consuming electrodes may be used. These and other modifications will occur to those skilled in the art, and may be employed without departing from my invention.

What I claim as new and desire to secure by Letters Patent of the United States is:

1. A machine wherein the movement of a reproducing means is controlled by the movement of a tracer wheel relative to a templet comprising a grooved track constituting the templet, a tracer wheel arranged for operation on a horizontal axis with its periphery in the groove of said grooved track, and means for rotating said tracer wheel.

2. A machine wherein the movement of a reproducing means is controlled by the movement of a tracer wheel relative to a templet comprising a grooved track, means for attaching said track to a supporting table, a tracer wheel supported on a horizontal axis with its periphery in the groove of said track, means engaging the sides of said track for holding said tracer wheel on said track, and means for rotating said tracer wheel.

3. Fusion apparatus comprising a pantographic linkage, fusing means mounted on said linkage, a grooved track, means for supporting said track in a predetermined configuration, a tracer wheel attached to said linkage and supported on a horizontal axis with its periphery in the groove of said grooved track, and means for rotating said tracer wheel.

In witness whereof, I have hereunto set my hand.

LEO H. BENOIT.